United States Patent
Kitamura et al.

(10) Patent No.: US 10,679,803 B2
(45) Date of Patent: Jun. 9, 2020

(54) KEYCAP STRUCTURE WITH RESPECT TO ENGAGING PROJECTIONS

(71) Applicant: LENOVO (SINGAPORE) PTE. LTD., Singapore (SG)

(72) Inventors: Masahiro Kitamura, Kanagawa (JP); Mitsuo Horiuchi, Kanagawa (JP); Satoshi Douzono, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/375,230

(22) Filed: Apr. 4, 2019

(65) Prior Publication Data

US 2019/0326080 A1 Oct. 24, 2019

(30) Foreign Application Priority Data

Apr. 24, 2018 (JP) .................................. 2018-82869

(51) Int. Cl.
| | | |
|---|---|---|
| *G06F 3/02* | (2006.01) | |
| *H01H 13/02* | (2006.01) | |
| *H01H 13/705* | (2006.01) | |
| *H01H 3/12* | (2006.01) | |

(52) U.S. Cl.
CPC ......... *H01H 13/705* (2013.01); *G06F 3/0202* (2013.01); *H01H 3/125* (2013.01); *H01H 13/02* (2013.01); *H01H 2221/036* (2013.01)

(58) Field of Classification Search
CPC ................. H01H 3/125; H01H 13/705; H01H 2221/058; G06F 3/0202; G06F 3/0221
See application file for complete search history.

(56) References Cited

U.S. PATENT DOCUMENTS

| | | | | |
|---|---|---|---|---|
| 7,709,762 B2* | 5/2010 | Lin | ........................ | H01H 3/125 200/344 |
| 2019/0013160 A1* | 1/2019 | Cheng | .................... | H01H 13/14 |
| 2019/0096604 A1* | 3/2019 | Yen | ...................... | H01H 13/705 |

FOREIGN PATENT DOCUMENTS

| | | |
|---|---|---|
| JP | 1997-063401 A | 3/1997 |
| JP | 1998-214536 A | 8/1998 |
| JP | 2006-344607 A | 12/2006 |
| JP | 2016-081393 A | 5/2016 |

* cited by examiner

*Primary Examiner* — Vanessa Girardi

(74) *Attorney, Agent, or Firm* — Antony P. Ng; Russell Ng PLLC

(57) ABSTRACT

A keycap detachably provided on a guide mechanism of a key switch includes a cap main body having a front face pressed at the time of key input and a rear face on the opposite side to the front face; and a first engaging projection and a second engaging projection, both of which protrude from the rear face of the cap main body with a gap therebetween so that an engaging portion of the guide mechanism is detachably engaged into the gap. At least a part of an area around the first engaging projection and the second engaging projection in the cap main body has a thin part thinner than other parts of the cap main body. As a result, the falling off of the keycap can be prevented.

11 Claims, 8 Drawing Sheets

KEYCAP STRUCTURE WITH RESPECT TO ENGAGING PROJECTIONS

PRIORITY CLAIM

The present application claims benefit of priority under 35 U.S.C. §§ 120, 365 to the previously filed Japanese Patent Application No. JP2018-82869 with a priority date of Apr. 24, 2018, which is incorporated by reference herein.

TECHNICAL FIELD

The present invention relates to keyboards in general, and in particular to a keyboard having a keycap.

BACKGROUND

An electronic device such as a personal computer includes a keyboard having a set of key switches. For example, a key switch may include a base plate, a pantograph type guide mechanism, and keycaps. Each keycap is detachably connected to a guide mechanism with a shaft member of the guide mechanism rotatably put between a pair of claw-shaped locking parts.

In order to satisfy the needs for reduction in thickness of an electronic device, it is necessary to reduce the height of a keycap as a whole. The height reduction of keycaps can be achieved by, for example, reducing the length of the pair of locking parts. However, when a heavy load is applied to the pair of locking parts at the time of attaching the shaft member of the guide mechanism between the pair of locking parts, which easily leads to an occurrence of a permanent deformation or damage in each locking part. The occurrence of this kind of permanent deformation or damage may cause the keycap to come off the guide mechanism.

Consequently, it would be desirable to provide a technique for preventing the fall-off of a key switch from a guide mechanism.

SUMMARY

In accordance with an embodiment of the present disclosure, a keycap is detachably provided on a guide mechanism of a key switch. The keycap includes a cap main body having a front face pressed at the time of key input and a rear face on the opposite side to the front face; and a first engaging projection and a second engaging projection, both of which protrude from the rear face of the cap main body with a gap therebetween so that an engaging portion of the guide mechanism is detachably engaged into the gap. At least a part of the area around the first engaging projection and the second engaging projection in the cap main body has a thin part thinner than other parts of the cap main body.

The thin part around the first engaging projection and the second engaging projection in the cap main body can be provided with elasticity. Thereby, both of the engaging projections are easily bent at the time of attaching the engaging portion of the guide mechanism into the gap between the engaging projections. As a result, even in the case of reducing the thickness of the keycap and reducing the protrusion lengths of the first and second engaging projections, load on the engaging projections can be reduced when the engaging portion of the guide mechanism is attached, thereby preventing a permanent deformation and damage of each engaging projection.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
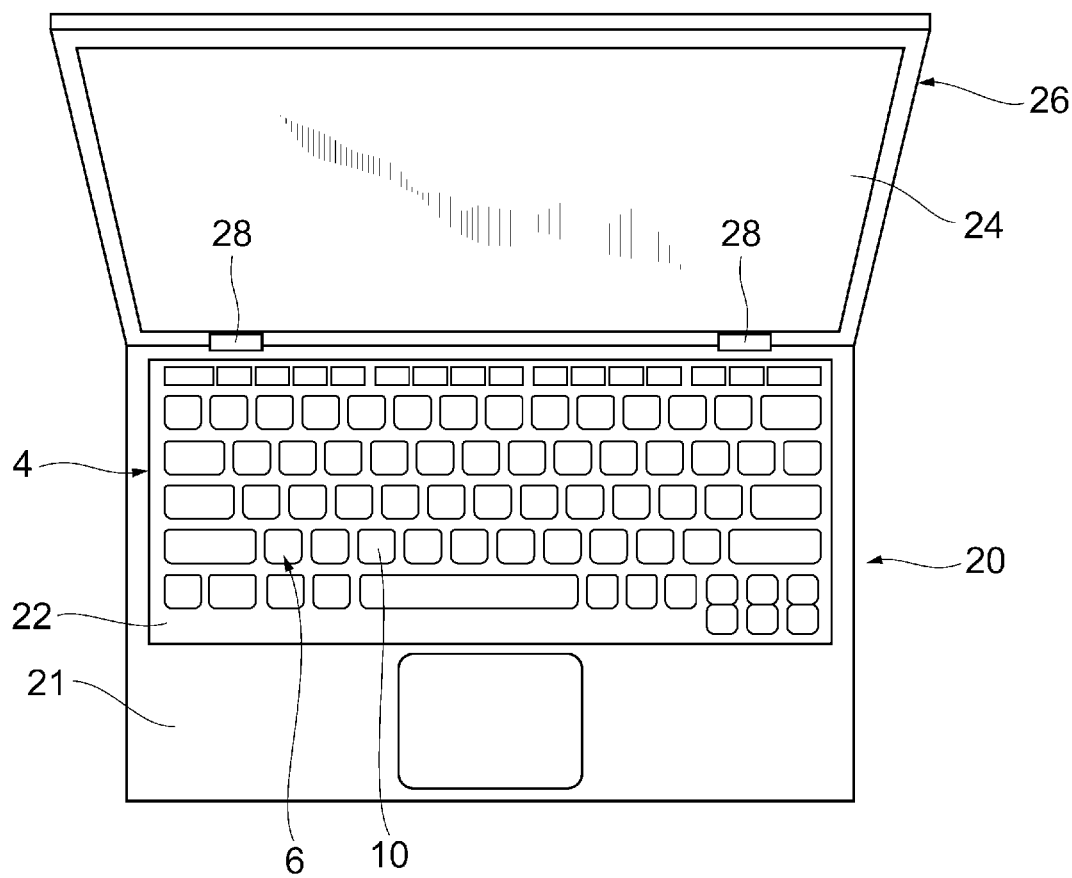
FIG. 1 is a diagram of an electronic device having a key switch with a keycap, according to a first embodiment.
Figure 1:
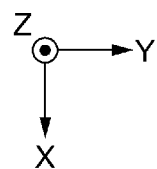

The embodiments of the present invention will be described with reference to drawings. In the second and subsequent embodiments, however, the same or similar components as or to those in the first embodiment are denoted by the same or similar reference numerals as or to those in the first embodiment, and the detailed description thereof will be omitted appropriately. In addition, the same advantageous effects, which are obtained in the second and subsequent embodiments, as those of the first embodiment will not be described as appropriate. The drawings of the embodiments are merely illustrative and the dimensions and shapes of respective portions are schematic, and therefore the technical scope of the present invention should not be limited to the embodiments.

Each drawing is provided with an orthogonal coordinate system including X-, Y-, and Z-axis directions for descriptive purposes in order to clarify the relationship between respective drawings and for better understanding of the positional relationships between respective members. The X-, Y-, and Z-axis directions correspond to first, second, and third directions, respectively. Each of the X-, Y-, and Z-axis directions is assumed to include a positive direction (the direction indicated by an arrow) and a negative direction (the direction opposite to the direction indicated by the arrow). Further, although the X, Y, and Z axes illustrated in the drawings are, for example, orthogonal to each other, these axes are not limited thereto as long as the axes intersect with each other and may intersect with each other at an angle other than 90°.

Referring to FIG. 1, an electronic device 2 provided with keycaps according to a first embodiment will be described by giving an example of a laptop personal computer. In the electronic device 2, a display unit 26 and an operating unit 20 are openably and closably coupled to each other with a pair of hinges 28 and 28 as fulcrums. In the electronic device 2 in the open position illustrated in FIG. 1, the display unit 26 displays an image on a display panel 24 and the operating unit 20 accepts an input from a user. In the electronic device 2 in the closed position, the display unit 26 is put on the top of the operating unit 20, so that the display unit 26 functions as the cover of the operating unit 20. The display panel 24 is, for example, a liquid crystal display panel or an organic EL display panel. The operating unit 20 includes a chassis 21 formed in a flat box shape and a keyboard 4 exposed to a face on the display unit 26 side of the chassis 21. Although not illustrated, the chassis 21 contains various electronic components inside. The electronic components are, for example, an electronic circuit board, arithmetic units such as a CPU or a GPU, and storage devices such as a ROM, a RAM, an HDD, and an SDD, a battery, and the like.

The keyboard 4 is an input device having a plurality of key switches 6. The plurality of key switches 6 are arranged in a matrix, for example, in the X- and Y-axis directions. In the example illustrated in FIG. 1, the keyboard 4 is an isolation style keyboard with interspaces provided between respective key switches 6, having a cosmetic frame 22 filling the interspaces around the respective key switches 6. The keyboard 4, however, is not limited to the isolation style, and the cosmetic frame 22 may be omitted, for example.

Figure 2:
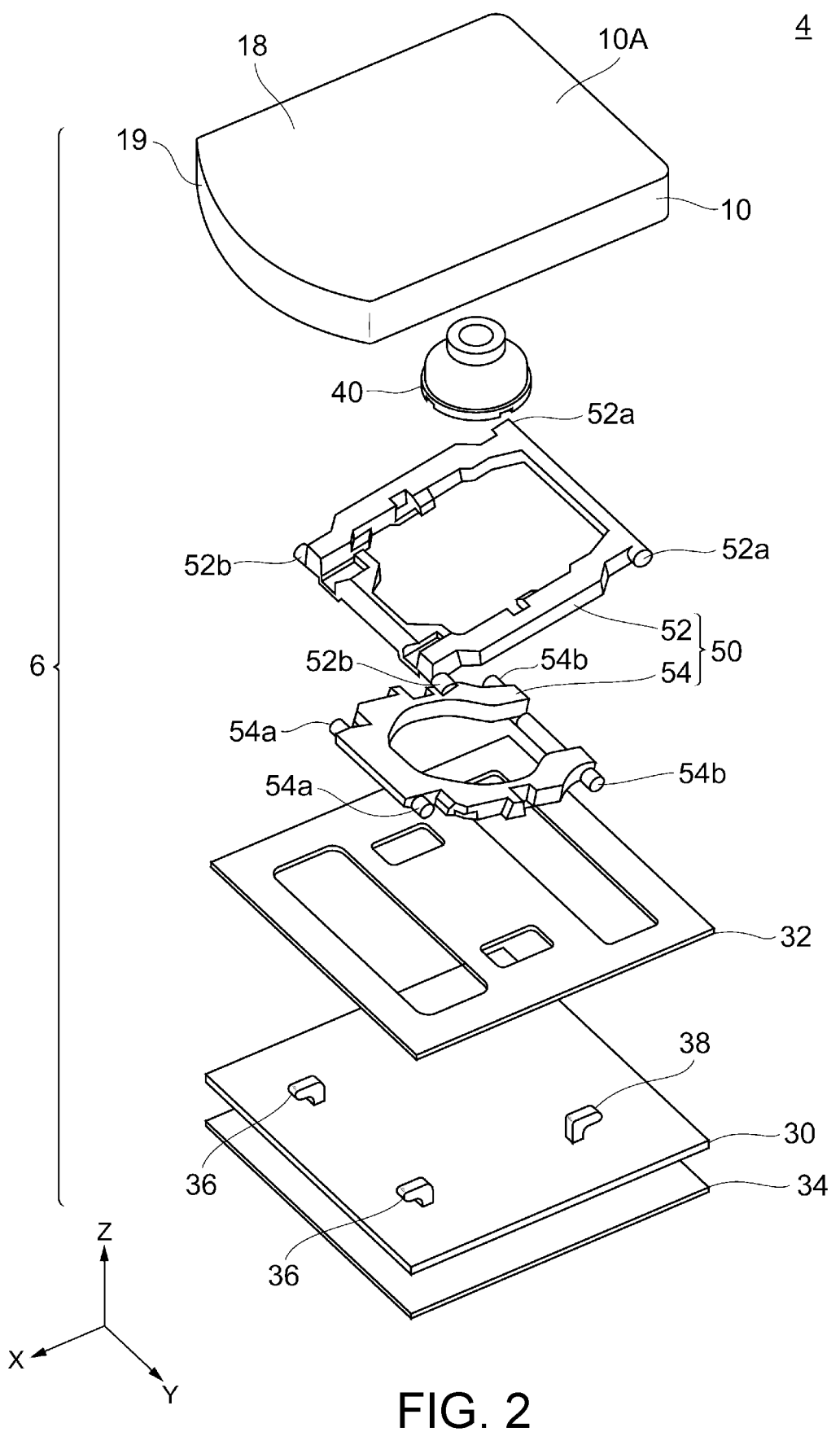
FIG. 2 is an exploded perspective view of the key switch from FIG. 1.
Figure 3:
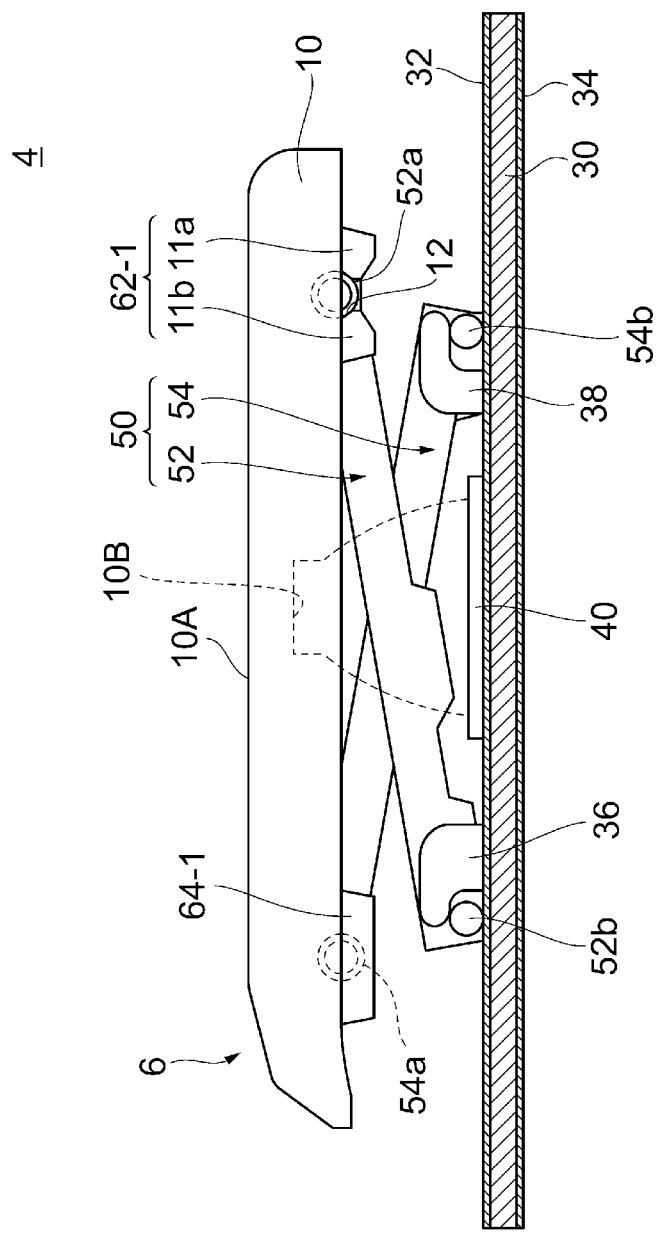
FIG. 3 is a side view of the key switch from FIG. 1.

As illustrated in FIGS. 2 and 3, each key switch 6 includes a keycap 10, a base plate 30, a membrane switch 32, a waterproof sheet 34, a rubber dome 40, and a guide mechanism 50. The keycap 10 accepts a key input performed by a user. The keycap 10 is formed of, for example, resin. The material of the keycap 10, however, is not limited and may be formed of metal.

The base plate 30 is a plate-like member provided over the entire keyboard 4, extending in the X- and Y-axis directions. All guide mechanisms 50 in the keyboard 4 are fitted to one base plate 30. The base plate 30 is provided with a pair of fixing portions 36 and 36 and a pair of fixing portions 38 and 38 for fitting the guide mechanism 50. The membrane switch 32 is a sheet-type member provided over the entire keyboard 4 similarly to the base plate 30 and is provided on the keycap 10 side of the base plate 30. The membrane switch 32 is a switch sheet having a trilaminar structure in which a contact is closed at the time of pressing, wherein a displacement of the keycap 10 is detected as a change in electric characteristics. The waterproof sheet 34 is a film-like member provided over the entire keyboard 4 similarly to the base plate 30 and is provided on the opposite side to the membrane switch 32 side of the base plate 30.

The rubber dome 40 is an elastic member provided between the membrane switch 32 and the keycap 10. The rubber dome 40 presses the membrane switch 32 when the keycap 10 is depressed by the user. Moreover, the rubber dome 40 returns the keycap 10 to the initial position when the keycap 10 is released from the pressure applied by the use. Incidentally, a member other than the rubber dome 40 such as, for example, a spring may be used instead of the rubber dome 40 as long as the member is able to press the membrane switch 32 and has a restoring force.

The guide mechanism 50 is provided between the base plate 30 and the keycap 10 to displaceably couple the keycap 10 to the base plate 30 detachably and along the Z-axis direction. The guide mechanism 50 is, for example, of a pantograph type, having an outer frame 52 and an inner frame 54 connected to each other. The outer frame 52 has a pair of engaging portions 52a in the Y-axis direction on the keycap 10 side and a pair of engaging portions 52b in the Y-axis direction on the base plate 30 side. Similarly, the inner frame 54 has a pair of engaging portions 54a in the Y-axis direction on the keycap 10 side and a pair of engaging portions 54b in the Y-axis direction on the base plate 30 side. The engaging portions 52a, 52b, 54a, and 54b may be formed as, for example, shaft portions extending along the Y-axis direction. The engaging portions 52a and 54a are engaged with the keycap 10, while the engaging portions 52b and 54b are engaged with the fixing portions 36 and 38 of the base plate 30. According to the configuration of the guide mechanism 50 described above, the keycap 10 is configured to move up and down with respect to the base plate 30 while the displacement in the front-and-rear and right-and-left directions is regulated. Specifically, when the keycap 10 is depressed by the user, the guide mechanism 50 is thereupon folded in such a way that the outer frame 52 contains the inner frame 54, by which the Z-axis downward movement of the keycap 10 is guided. On the other hand, when the keycap 10 is released from the pressure applied by the user, the guide mechanism 50 is thereupon unfolded in such a way that the outer frame 52 and the inner frame 54 intersect with each other, by which the Z-axis upward movement of the keycap 10 is guided.

As illustrated in FIG. 2, the keycap 10 includes a cap main body 18 and an end portion 19 protruding from the rim of the cap main body 18 toward the base plate 30 side. The cap main body 18 has a front face 10A pressed by the user at the time of key input and a rear face 10B present on the opposite side to the front face 10A in the Z-axis direction. A letter or symbol indicating a function of each key switch 6 is appended to the front face 10A by printing, engraving, or the like.

Figure 4:
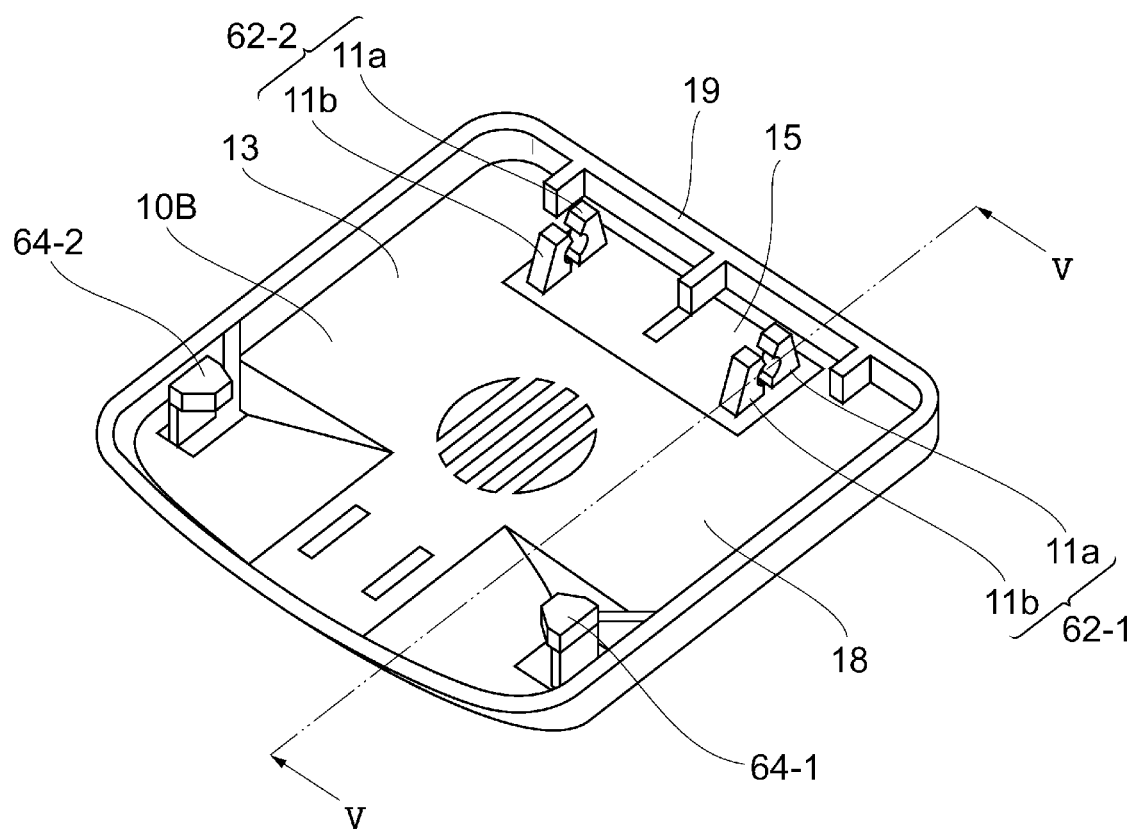
FIG. 4 is a perspective view of the rear face of the keycap from FIG. 1.

As illustrated in FIG. 4, a pair of engaging units 62-1 and 62-2 are provided on the rear face 10B so as to correspond to the pair of engaging portions 52a and 52a on the guide mechanism 50 side. Furthermore, a pair of locking pieces 64-1 and 64-2 are provided on the rear face 10B so as to correspond to the pair of engaging portions 54a and 54a on the guide mechanism 50 side. The pair of engaging units 62-1 and 62-2 are arranged axisymmetrically with respect to the central axis along the X-axis direction of the cap main body 18 on one end portion side in the X-axis direction of the cap main body 18. Similarly, the pair of locking pieces 64-1 and 64-2 are arranged axisymmetrically with respect to the central axis along the X-axis direction of the cap main body 18 on the other end portion side in the X-axis direction of the cap main body 18. Moreover, the pair of locking pieces 64-1 and 64-2 are arranged on the outer side in the Y-axis direction than the pair of engaging units 62-1 and 62-2, respectively. The locking pieces 64-1 and 64-2 vertically protrude from the rear face 10B with their tips each having a hook shape facing inward in the Y-axis direction. The engaging portions 54a and 54a are detachably engaged with the locking pieces 64-1 and 64-2, respectively.

Figure 5:
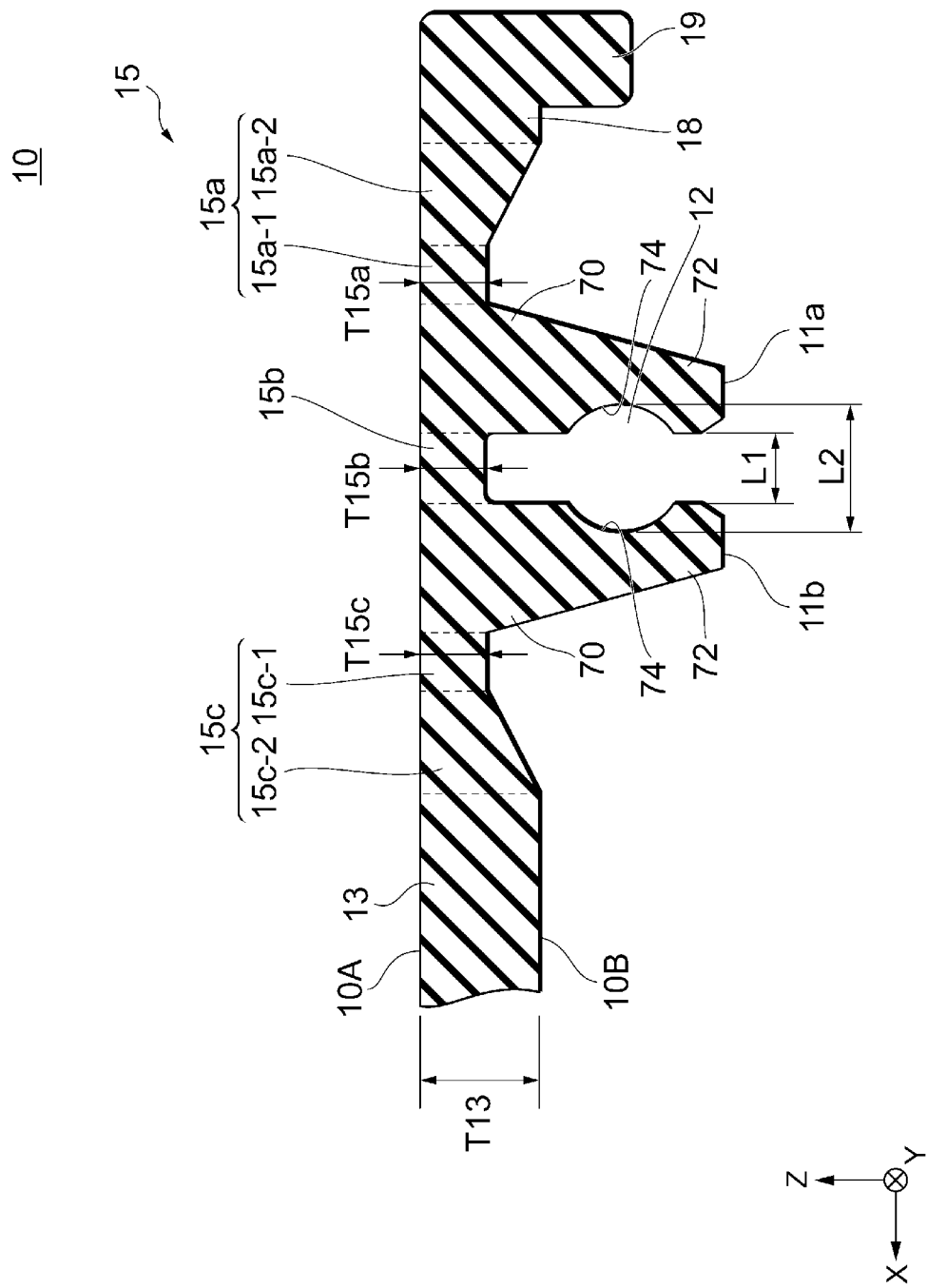
FIG. 5 is a sectional view taken along line V-V of FIG. 4.

As illustrated in FIGS. 4 and 5, each of the pair of engaging units 62-1 and 62-2 has a first engaging projection 11a and a second engaging projection 11b. The first engaging projection 11a and the second engaging projection 11b protrude from the rear face 10B with a gap therebetween. The engaging portion 52a is inserted into the gap to detachably engage with the first engaging projection 11a and the second engaging projection 11b. The first engaging projection 11a and the second engaging projection 11b are placed side by side in the X-axis direction with the gap therebetween having an axisymmetric shape with respect to the face along the Z-axis direction. Specifically, in the first engaging projection 11a and the second engaging projection 11b, the outer part on the opposite side to the gap extends obliquely inward from the rear face 10B, while the inner part vertically extends from the rear face 10B with a semicircular opening 74 between a root part 70 and a tip part 72. The first engaging projection 11a and the second engaging projection 11b define the above gap by the inner parts facing each other from the root part 70 to the tip part 72. Furthermore, the first engaging projection 11a and the second engaging projection 11b are formed so to be increased in width from the tip part 72 to the root part 70 as a whole. In other words, the first engaging projection 11a and the second engaging projection 11b are each formed gradually wider from the tip part 72 to the root part 70 toward the opposite side to the side on which the first and second engaging projections 11a and 11b face each other. Moreover, the tip part 72 has an inclined surface inclined outwardly in the inner part so as to easily receive the insertion of the engaging portion 52a. The semicircular openings 74 and 74 facing each other form a substantially-cylindrical engagement receiving portion 12 so that the inserted engaging portion 52a fits therein.

Incidentally, with respect to the gap between the first engaging projection 11a and the second engaging projection 11b, the minimum distance L1 along the X-axis direction of the tip part 72 is smaller than the distance L2 along the X-axis direction of the engagement receiving portion 12 (L1<L2). On the other hand, the diameter of the engaging portion 52a is greater than the distance L1 and smaller than the distance L2. According to the aforementioned dimension settings, when the keycap 10 is fitted to the guide mechanism 50, the first engaging projection 11a and the second engaging projection 11b temporarily deform in a direction of opening thereof to push the gap therebetween apart when the engaging portion 52a passes through the gap between the tip part 72 of the first engaging projection 11a and the tip part 72 of the second engaging projection 11b. Thereafter, when the engaging portion 52a reaches the engagement receiving portion 12, the first engaging projection 11a and the second engaging projection 11b return to the original shape. At this time, the engaging portion 52a is held by the engagement receiving portion 12 without slipping out in a free state. In addition, also when the keycap 10 is detached from the guide mechanism 50, the first engaging projection 11a and the second engaging projection 11b temporarily deform similarly.

Subsequently, the thickness of the cap main body 18 will be described. The thickness of the cap main body 18 defined by the front face 10A and the rear face 10B is not uniform and a part in which the engaging units 62-1 and 62-2 are present is different in thickness from other parts. Specifically, in terms of thickness, the cap main body 18 includes a basic part 13 having a first thickness and a thin part 15 having a thickness less than the first thickness as illustrated in FIG. 4. The thin part 15 is substantially rectangular in the back view of the cap main body 18 and includes the engaging units 62-1 and 62-2 inside.

As illustrated in FIG. 5, the thin part 15 has a first outer thin portion 15a, a middle thin portion 15b, and a second outer thin portion 15c placed side by side in the X-axis direction in a relationship between the first engaging projection 11a and the second engaging projection 11b. The first outer thin portion 15a is a portion opposite to the above gap of the first engaging projection 11a in the cap main body 18. Similarly, the second outer thin portion 15c is a portion opposite to the above gap of the second engaging projection 11b in the cap main body 18. The first outer thin portion 15a has a thinnest region 15a-1 leading to an outer part of the root part 70 of the first engaging projection 11a and an inclined region 15a-2 slantingly extending from the region 15a-1 and leading to the basic part 13. Similarly, the second outer thin portion 15c has a thinnest region 15c-1 leading to an outer part of the root part 70 of the second engaging projection 11b and an inclined region 15c-2 slantingly extending from the region 15c-1 and leading to the basic part 13. The middle thin portion 15b is a part between the first engaging projection 11a and the second engaging projection 11b in the cap main body 18.

Incidentally, the region 15a-1 of the first outer thin portion 15a, the region 15c-1 of the second outer thin portion 15c, and the middle thin portion 15b have the same thickness as each other (T15a=T15b=T15c). Although the thickness may be different from each other, the thicknesses are smaller than the thickness of the basic part 13 (T15a<T13, T15b<T13, T15c<T13). As an example of a case where the electronic device 2 is a laptop personal computer, the thickness T13 is 0.55 mm and the thicknesses T15a, T15b, and T15c are each 0.45 mm. In that case, if a difference in thickness between the basic part 13 and the thin part 15 is 0.15 mm or greater, sink marks may occur on the front face 10A due to a difference in the degree of mold shrinkage. Therefore, the ratio of the thin part 15 relative to the basic part 13 is preferably 0.8 or greater.

As described above, according to the keycap 10 of this embodiment, there is the thin part 15 thinner than other parts of the cap main body 18 around the first engaging projection 11a and the second engaging projection 11b in the cap main body 18. Specifically, an adjacent area to each root part 70 of the first engaging projection 11a and the second engaging projection 11b is formed to be thinner than the basic part 13 in the cap main body 18. More specifically, the portions respectively leading to the outer part and the inner part of each root part 70 are formed as the first outer thin portion 15a, the middle thin portion 15b, and the second outer thin portion 15c.

The adoption of the embodiment of the thin portions provides elasticity to the thin part 15 around the first engaging projection 11a and the second engaging projection 11b in the cap main body 18. This enables the engaging projections 11a and 11b to bend more easily so that the tip parts 72 thereof open when the engaging portion 52a of the guide mechanism 50 is attached into the gap between the engaging projections 11a and 11b. Therefore, even in the case of reducing the thickness of the keycap 10 and decreasing the protrusion lengths of the first engaging projection 11a and the second engaging projection 11b, the load on the engaging projections 11a and 11b can be reduced at the time of attachment of the engaging portion 52a of the guide mechanism 50, thereby preventing permanent deformation and damage of the engaging projections 11a and 11b. Therefore, the fall-off of the keycap 10 from the guide mechanism 50 can be prevented.

Figure 6:
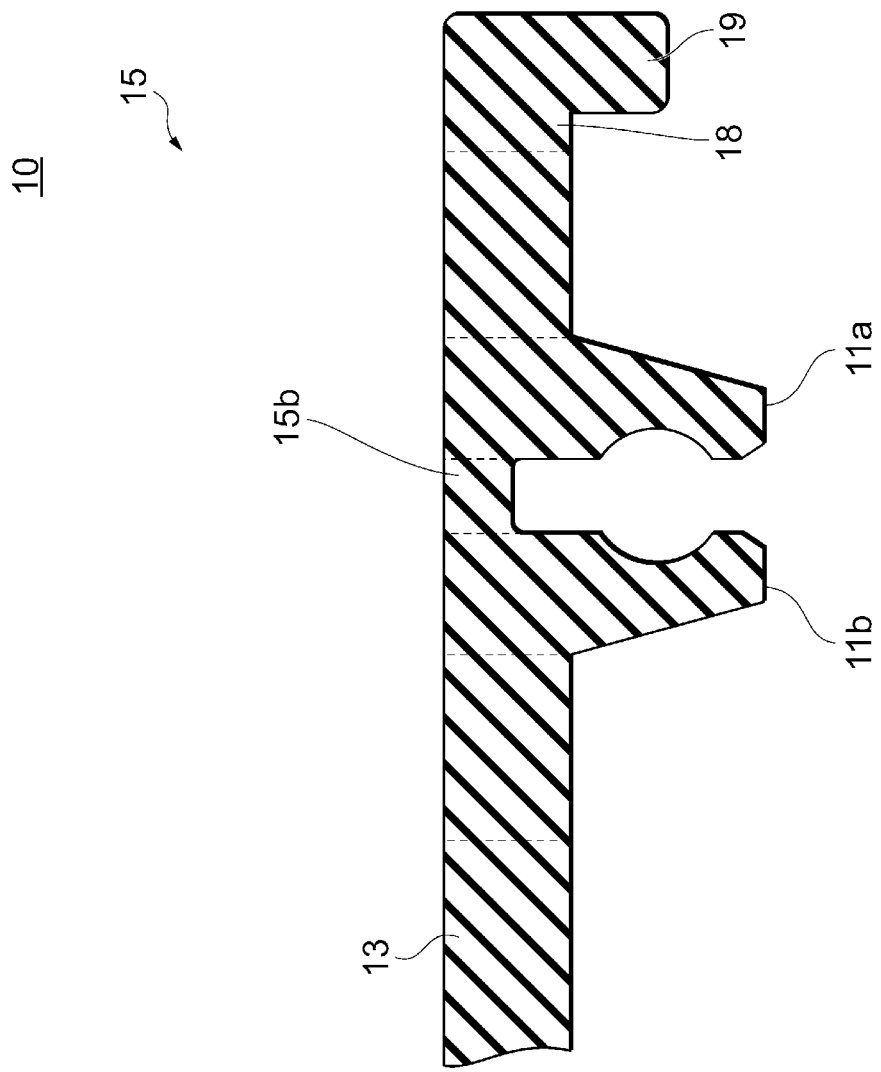
FIG. 6 is a sectional view similar to FIG. 5 with respect to a keycap according to a second embodiment.
Figure 7:
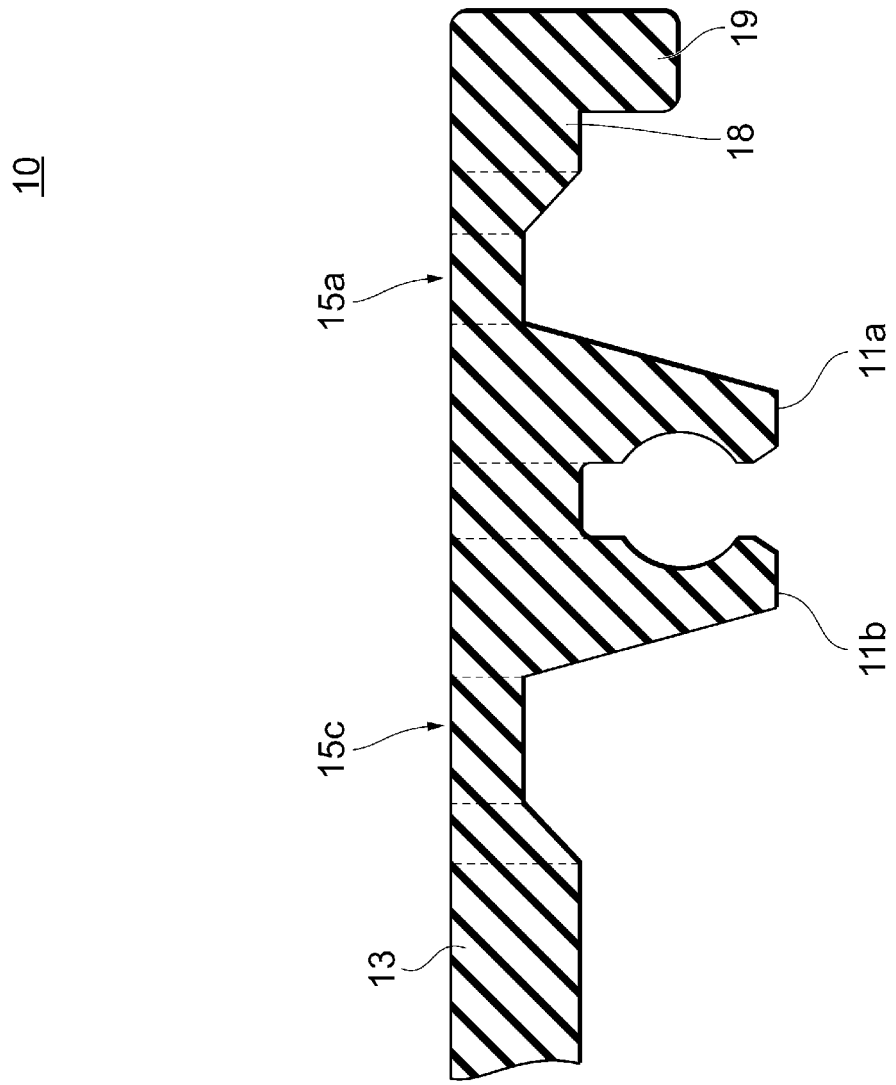
FIG. 7 is a sectional view similar to FIG. 5 with respect to a keycap according to a third embodiment.

In other embodiments, at least one of the first outer thin portion 15a, the second outer thin portion 15c, and the middle thin portion 15b may be omitted. For example, as illustrated in FIG. 6, the first outer thin portion 15a and the second outer thin portion 15c may be omitted with these portions formed as a part of the basic part 13. Alternatively, as illustrated in FIG. 7, the middle thin portion 15b may be omitted with this portion formed as a part of the basic part 13. In this manner, like the embodiments illustrated in FIGS. 6 and 7, the thin part 15 may be present in at least a part of the area around the first engaging projection 11a and the second engaging projection 11b in the cap main body 18.

On the other hand, as in the embodiment illustrated in FIG. 5, the thin part 15 may be present all around the first engaging projection 11a and the second engaging projection 11b in the cap main body 18. Particularly, as described above, the middle thin portion 15b is preferably formed in addition to the first outer thin portion 15a and the second outer thin portion 15c. This increases the heights of the first engaging projection 11a and the second engaging projection 11b from the rear face 10B. This enables a reduction in the stress generated in the root parts 70 of the first engaging projection 11a and the second engaging projection 11b at the time of attachment of the engaging portion 52a of the guide mechanism 50, which provides a more effective countermeasure against permanent deformation and the like of the engaging projections 11a and 11b. Moreover, if the thicknesses T15a, T15b, and T15c are equal, a well-balanced reduction in the stress can be achieved.

The above-described embodiments have been described for purposes of better understanding of the present invention, and not for limiting the interpretation of the present invention. The present invention can be modified or improved without deviating from the gist of the invention and includes equivalents thereof. Specifically, appropriate modifications of the embodiments in design made by a person skilled in the art are also included in the scope of the invention as long as they include the features of the present invention. For example, the elements included in the embodiments and the arrangement, material, condition, shape, size, etc. of the elements are not limited to those illustrated and may be appropriately modified. Moreover, it should be understood that the elements included in the foregoing embodiments may be combined with each other as long as technically possible and combinations thereof are also included in the scope of the present invention as long as they include the features of the present invention.

For example, it is possible to omit one of the pair of engaging units 62-1 and 62-2 each having the first engaging projection 11a and the second engaging projection 11b. Furthermore, the first engaging projection 11a and the second engaging projection 11b need not be formed in the aforementioned axisymmetric shape, but may have shapes different from each other. In addition, the first outer thin portion 15a and the second outer thin portion 15c need not have the axisymmetric shape similarly to the first engaging projection 11a and the second engaging projection 11b. Moreover, the first outer thin portion 15a and the second outer thin portion 15c need not have the inclined regions 15a-2 and 15c-2, respectively. Alternatively, the inclined regions 15a-2 and 15c-2 may change in the degree of the inclination gradually or discontinuously or each of the inclined regions 15a-2 and 15c-2 may be curved or step-like. As in the aforementioned embodiment, however, the inclined regions 15a-2 and 15c-2 with fixed inclination prevents the hindrance to the flow of resin in the mold, for example, in the case of injection-molding the keycap by using resin, thereby improving the yield of the keycap 10.

Furthermore, the type of the guide mechanism 50 may be other than the pantograph type and the engaging portion 52a may have a shape other than the shape of the shaft portion such as, for example, a spherical shape. The electronic device is not limited to a laptop personal computer, but may be a cell phone device, a smartphone, an electronic organizer, or a convertible tablet personal computer or the like. In addition, the keycap may be used for a plurality of key switches like a keyboard or for a single key switch.

Figure 8:
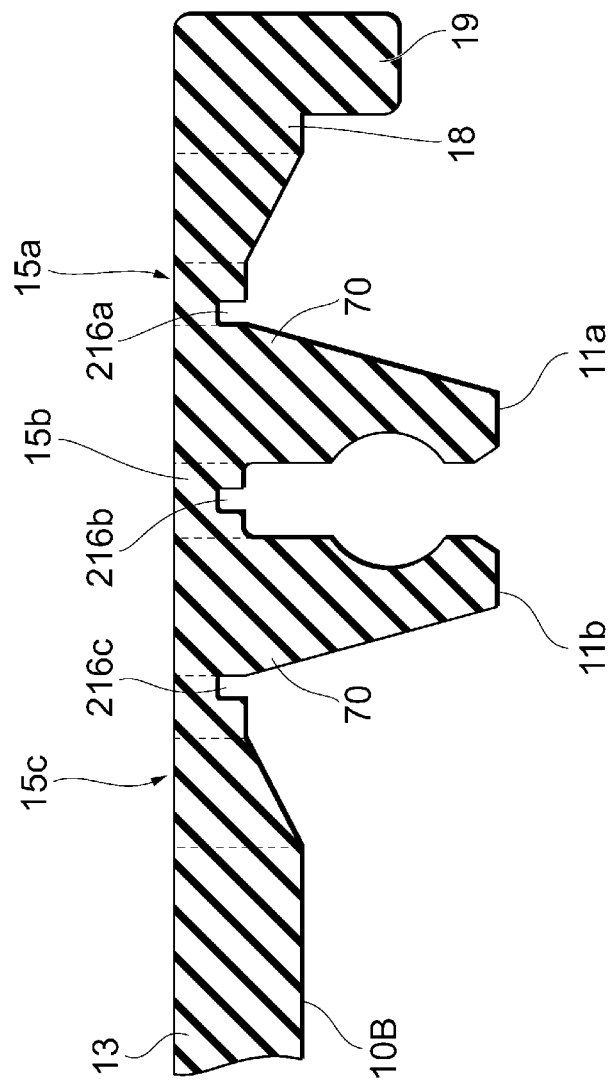
FIG. 8 is a sectional view similar to FIG. 5 with respect to a keycap according to a fourth embodiment.

Referring to FIG. 8, a keycap 210 according to a fourth embodiment will be described. The main difference between the first embodiment and the fourth embodiment is that recessed portions 216a, 216b, and 216c are formed in the rear face 10B with respect to the first outer thin portion 15a, the middle thin portion 15b, and the second outer thin portion 15c. The recessed portions 216a, 216b, and 216c each have a groove shape opening into the rear face 210B where the first outer thin portion 15a, the middle thin portion 15b, and the second outer thin portion 15c are partially further reduced in thickness. According to the fourth embodiment, the thin part 15 around the first engaging projection 11a and the second engaging projection 11b of the cap main body 18 can be further elasticized.

The positions of the recessed portions 216a, 216b, and 216c can be set arbitrarily. For example, the recessed portions 216a and 216c can be set in positions adjacent to the respective root parts 70 of the first engaging projection 11a and the second engaging projection 11b. Moreover, the position of the recessed portion 216b can be set in the central part of the middle thin portion 15b in the X-axis direction. In other embodiments, at least one of the recessed portions 216a, 216b, and 216c may be formed.

As has been described, the present invention provides an improved guide mechanism for a keyboard.

While the invention has been particularly shown and described with reference to a preferred embodiment, it will be understood by those skilled in the art that various changes in form and detail may be made therein without departing from the spirit and scope of the invention.

What is claimed is:

1. An electronic device comprising:
    a display; and
    a keyboard having a plurality of switch devices, wherein one of said switch devices includes
        a guide mechanism;
        a keycap having a front face and a rear face opposed to said front face; and
        a first pair of engaging projections and a second pair of engaging projections, both pairs protrude from said rear face of said keycap, for detachably engaging said guide mechanism at a first opening located between said first pair of engaging projections and at a second opening located between said second pair of engaging projections, wherein said first pair of engaging projections is located in a thin area thinner than other areas of said keycap, wherein said thin area includes a first outer thin portion located adjacent to one engaging projection of said first pair of engaging projections, a second outer thin portion located adjacent to another one engaging projection of said pair of engaging projections, and a middle thin portion located between said first pair of engaging projections, wherein said first outer thin portion includes a flat region and an inclined region, and said second outer thin portion includes a flat region and an inclined region, wherein said flat regions of said first and second outer thin portion include a recess.

2. The electronic device of claim 1, wherein said middle thin portion includes a recess.

3. The electronic device of claim 1, wherein said thin area includes a third outer thin portion located adjacent to one engaging projection of said second pair of engaging projections, a fourth outer thin portion located adjacent to another one engaging projection of said second pair of engaging projections, and a second middle thin portion located between said second pair of engaging projections.

4. A key switch comprising:
    a guide mechanism;
    a keycap having a front face and a rear face opposed to said front face; and
    a first pair of engaging projections and a second pair of engaging projections, both pairs protrude from said rear face of said keycap, for detachably engaging said guide mechanism at a first opening located between said first pair of engaging projections and at a second opening located between said second pair of engaging projections, wherein said first pair of engaging projections is located in a thin area thinner than other areas of said keycap, wherein said thin area includes a first outer thin portion located adjacent to one engaging projection of said first pair of engaging projections, a second outer thin portion located adjacent to another one engaging projection of said pair of engaging projections, and a middle thin portion located between said first pair of engaging projections, wherein said first outer thin portion includes a flat region and an inclined region, and said second outer thin portion includes a flat region and an inclined region, wherein said flat regions of said first and second outer thin portion include a recess.

5. The key switch of claim 4, wherein said middle thin portion includes a recess.

6. The key switch of claim 4, wherein said thin area includes a third outer thin portion located adjacent to one engaging projection of said second pair of engaging projections, a fourth outer thin portion located adjacent to another one engaging projection of said second pair of engaging projections, and a second middle thin portion located between said second pair of engaging projections.

7. The key switch of claim 6, wherein said third outer thin portion includes a flat region and an inclined region, and said fourth outer thin portion includes a flat region and an inclined region.

8. A keyboard comprising:
a chassis; and
a plurality of key switches contained within said chassis, wherein one of said key switches includes
  a guide mechanism;
  a keycap having a front face and a rear face opposed to said front face; and
  a first pair of engaging projections and a second pair of engaging projections, both pairs protrude from said rear face of said keycap, for detachably engaging said guide mechanism at a first opening located between said first pair of engaging projections and at a second opening located between said second pair of engaging projections, wherein said first pair of engaging projections is located in a thin area thinner than other areas of said keycap, wherein said thin area includes a first outer thin portion located adjacent to one engaging projection of said first pair of engaging projections, a second outer thin portion located adjacent to another one engaging projection of said pair of engaging projections, and a middle thin portion located between said first pair of engaging projections, wherein said first outer thin portion includes a flat region and an inclined region, and said second outer thin portion includes a flat region and an inclined region, wherein said flat regions of said first and second outer thin portion include a recess.

9. The keyboard of claim 8, wherein said middle thin portion includes a recess.

10. The keyboard of claim 8, wherein said thin area includes a third outer thin portion located adjacent to one engaging projection of said second pair of engaging projections, a fourth outer thin portion located adjacent to another one engaging projection of said second pair of engaging projections, and a second middle thin portion located between said second pair of engaging projections.

11. The keyboard of claim 10, wherein said third outer thin portion includes a flat region and an inclined region, and said fourth outer thin portion includes a flat region and an inclined region.

* * * * *